C. ELLIS.
CHEMICAL PROCESS.
APPLICATION FILED MAY 17, 1912.
1,184,086.
Patented May 23, 1916.
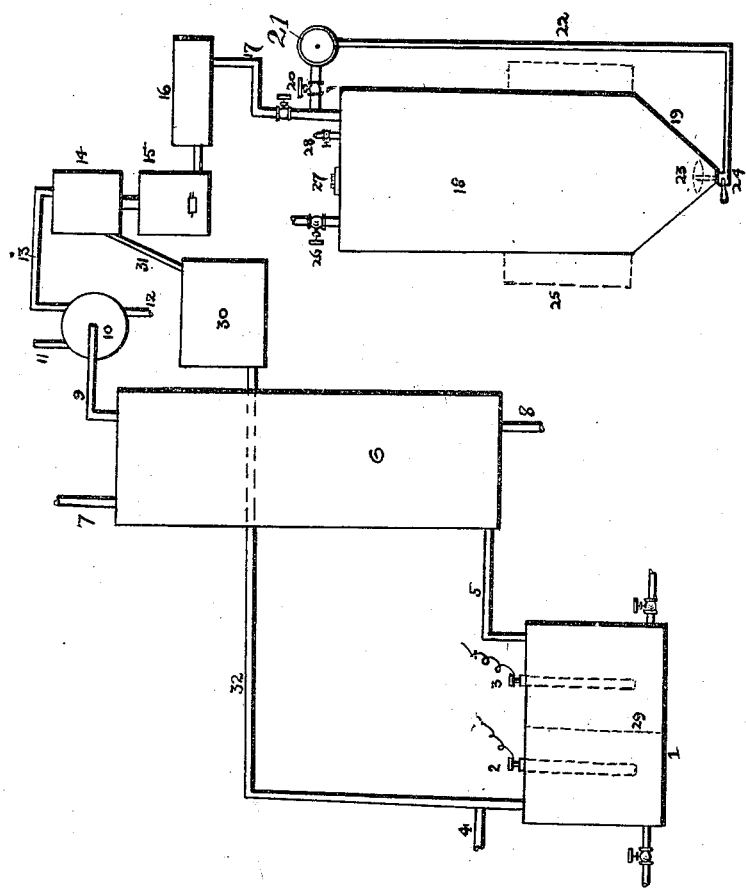
WITNESSES:
INVENTOR

UNITED STATES PATENT OFFICE.

CARLETON ELLIS, OF MONTCLAIR, NEW JERSEY.

CHEMICAL PROCESS.

1,184,086.  Specification of Letters Patent.   Patented May 23, 1916.

Application filed May 17, 1912. Serial No. 697,993.

*To all whom it may concern:*

Be it known that I, CARLETON ELLIS, a citizen of the United States, and a resident of Montclair, in the county of Essex and State of New Jersey, have invented certain new and useful Improvements in Chemical Processes, of which the following is a specification.

The invention relates to a process of producing caustic soda, chlorid and hydrogenated oil, and more specifically to the process of hydrogenating organic material such as fatty acids or esters carrying unsaturated bodies in the presence of a catalyzer, preferably of a colloidal character, under suitable thermal conditions, involving the production of hydrogen containing catalyzer poisons, by the electrolysis of brine and the like, and the removal of the toxic halogen and other catalyzer poisons, from the gas prior to contacting same with the organic material to be treated; all substantially as hereinafter described or in an equivalent manner thereunder.

Hydrogen obtained from the electrolysis of aqueous solutions of sodium chlorid or salt carries a small, often almost imperceptible amount of chlorin or sodium chlorid or both or similar halogen material, which acts as a catalyzer-poison from such bodies as finely-divided metallic nickel and the like, and therefore, in using hydrogen for the purpose of saturating fatty material, no efficiency can be secured when using the gas directly under these circumstances.

In the present invention in its preferred form the raw hydrogen undergoes a special preparation, whereby in its use for hydrogenation, the catalytic body remains unimpaired for a long time, and eventually loses its efficiency because of the accumulation of pitchy or tar-like bodies on its surface, rather than by toxic decline.

In its preferred form the invention is shown by the accompanying diagrammatic drawings, which depict in elevation apparatus suitable for carrying out the process hereunder.

In the drawings, 1 is an electrolytic cell containing brine, having the electrodes 2 and 3, the chlorin outlet 4 and the hydrogen outlet 5. The cell contains a porous diaphragm or equivalent device shown at 29. The hydrogen eduction pipe 5 leads to the tower 6, which is filled with coke or other coarsely-granular material.

7 is a water inlet pipe and 8 is a water outlet or discharge pipe. The pipe 9 leads from the tower 6 to the spray fan 10 and serves to convey the hydrogen gas from the former to the latter. The spray fan or blower has water inlets and outlets, 11 and 12 respectively. A gas eduction pipe leads from the spray blower to the purifiers 14, 15 and 16. The purified gas is taken by the pipe 17 to a hydrogenating receptacle 18. The latter has a conical or boshed lower portion 19. From the gas main 17 a pipe 20 leads to the circulating pump 21, from the latter there being a gas discharge pipe 22, terminating in the bottom of the cone 19 and delivering gas through a distributing device 23, to the receptacle 18. 24 is a draw off cock at the bottom of the said receptacle.

A heating jacket is shown at 25.

26 is an inlet or oil-charging pipe.

27 is a plugged opening for charging catalyzer, etc.

28 is a vent pipe.

The operating of the process in accordance with the illustrative apparatus set forth herein is as follows:—An electric current of suitable strength is passed through the cell 1 by means of the electrodes 2 and 3. The cell contains a solution of brine or similar material, and the chlorin and hydrogen evolved are kept from mixing to a very great extent by the diaphragm 29. Thus caustic soda is formed in the cell while chlorin is removed through the pipe 4 and hydrogen through the pipe 5. Entering the tower 6, the gas meets a downward current of water which accomplishes a preliminary washing or rough removal of the traces of chlorin and salt vapors, etc., in the gas. The hydrogen next passes to the rotary scrubber or spray blower 10, through which water also is passed; and the rapid rotation of the blades of the "fan" or impeller wheel causes the gas and water to be brought into intimate contact. The gas next passes into the lime chamber 14, by the pipe 13 which has a vertical portion wherein the spray produced in the scrubber 10 and entrained by the gas, has opportunity to settle to some extent. The chamber 14 is charged with quicklime and serves to remove moisture and any remaining chlorin. The dried gas then passes into the chamber 15 in which is maintained a bed of heated copper turnings. Finally the gas passes through the drier 16 and goes to the hydrogenation chamber 18. Or if desired, the gas may be stored in an ordinary gas holder until ready for use.

The oil to be treated is run into the chamber 18 to a depth such that the chamber is about two thirds filled. Catalyzer is added through the inlet 27. The oil is heated to about 150° C. or so and the pump 21 put in motion. The gas is thus bubbled through the oil in a cyclic path and as fast as absorbed fresh quantities of the poison-free gas are admitted by the pipe 17. When the oil has been saturated to a sufficient degree it is drawn off by the valve 24. The lime more or less hydrated in the chamber 14 is passed through the chute 31, to the chlorinating chamber 30, to which chlorin gas from the cell 1, is brought.

It is desirable to use the hydrogen gas as soon as possible after its generation, especially in the peculiar or nascent state in which it is evolved by the electrolysis of ordinary metallic chlorids, and if certain precautions be taken in regard to the temperature of reaction and other conditions, it is possible, easy and cheap to produce from said unsaturated organic material, valuable saturated derivatives. As to the cause of this peculiarly favorable condition of the electrolytic hydrogen for producing these reactions, I am unable to speak definitely, but it is apparently due to something more than a mere condition of nascency. Perhaps the hydrogen atoms or ions still retain the electric charges or other properties given them in electrolysis.

This application is a divisional continuation in part of application Serial No. 686,988, particularly as regards the use of electrolytic hydrogen.

Among the unsaturated bodies which may be treated in accordance with the present invention are the fatty oils or esters, such as corn, cotton seed, castor, fish and menhaden oils, various oily bodies as wool grease, horse fat, tallow, garbage grease and the like; hydrocarbon oils containing unsaturated compounds, naphthalene and so forth.

A number of catalyzers are adapted for hydrogenating oily material in the illustrative manner above described. Colloidal nickel may be used, especially with fatty esters.

The peculiar susceptibility of the colloidal form of catalytic metal to the toxic action of chlorids or chlorin renders it important to free the electrolytic hydrogen in a most thorough manner from these catalyzer poisons.

With finely-divided reduced nickel in the reduction of fatty esters a temperature above 100° C. is usually required while with the colloidal forms temperatures below 100° C. tend to better the longevity of the catalyzer. The pressure of the hydrogen gas on or in the body to be treated may be varied according to circumstances, from below to well above atmospheric pressure.

I claim—

1. The process of hydrogenating oils, fats and the like containing unsaturated bodies which comprises contacting the same with a nickel catalyzer in colloidal form and hydrogen gas free from chlorin and chlorids.

2. The process of hydrogenating oils, fats and the like containing unsaturated bodies which comprises contacting the same with a nickel catalyzer in colloidal form and freshly prepared and abnormally active electrolytic hydrogen, such gas being substantially free from chlorin and chlorids.

3. The process of hydrogenating oils, fats and the like containing unsaturated bodies which comprises contacting the same with a catalyzer comprising nickel in a colloidal form, and compressed hydrogen gas substantially free from chlorin and chlorids.

4. The process of hydrogenating oils, fats and the like containing unsaturated bodies which comprises contacting the same with a colloidal nickel catalyzer at a temperature of about 100° C. and with hydrogen gas substantially free from chlorin and chlorids and under superatmospheric pressure.

5. The process of hydrogenating oils, fats and the like containing unsaturated bodies which comprises contacting the same with a nickel catalyzer in colloidal form and freshly prepared and abnormally active hydrogen produced by the electrolysis of an aqueous solution of sodium chlorid such gas being substantially free from chlorin and chlorids.

6. The process of hydrogenating oils, fats and the like containing unsaturated bodies which comprises contacting the same with a nickel catalyzer in a form peculiarly susceptible to the toxic action of chlorin and chlorids, and freshly prepared and abnormally active hydrogen produced by electrolysis, such gas being substantially free from chlorin and chlorids.

7. The process of hydrogenating oils, fats and the like containing unsaturated bodies which comprises contacting the same with a nickel catalyzer in a form peculiarly susceptible to the toxic action of chlorin and chlorids, and freshly prepared and abnormally active hydrogen under pressure, produced by the electrolysis of an aqueous solution of a chlorid, such gas being collected separately from the chlorin and immediately freed from the chlorids and dried.

Signed at Montclair, in the county of Essex and State of New Jersey, this 9th day of May, A. D. 1912.

CARLETON ELLIS.

Witnesses:
ALFRED A. WELLS,
I. DAVID LUBETZKI.

Copies of this patent may be obtained for five cents each, by addressing the "Commissioner of Patents, Washington, D. C."